United States Patent
Busam et al.

(10) Patent No.: US 9,927,290 B2
(45) Date of Patent: Mar. 27, 2018

(54) ARRANGEMENT AND METHOD FOR DETECTING AND INDICATING LASER RADIATION

(71) Applicants: Daniel Busam, Landau (DE); Andreas Weber, Wilgartswiesen (DE)

(72) Inventors: Daniel Busam, Landau (DE); Andreas Weber, Wilgartswiesen (DE)

(73) Assignee: STABILA MESSGERATE GUSTAV ULLRICH GMBH, Anweiler (DE)

( * ) Notice: Subject to any disclaimer, the term of this patent is extended or adjusted under 35 U.S.C. 154(b) by 173 days.

(21) Appl. No.: 13/887,355

(22) Filed: May 5, 2013

(65) Prior Publication Data

US 2013/0313407 A1    Nov. 28, 2013

(30) Foreign Application Priority Data

May 4, 2012 (DE) .......................... 10 2012 103 932

(51) Int. Cl.
*G01J 1/42* (2006.01)
*G01J 1/44* (2006.01)
*G01C 15/00* (2006.01)

(52) U.S. Cl.
CPC .............. *G01J 1/42* (2013.01); *G01C 15/006* (2013.01); *G01J 1/44* (2013.01)

(58) Field of Classification Search
CPC .............. G01J 1/42; G01J 1/44; G01C 15/006
USPC .......................... 250/214 R; 356/141.2–141.5
See application file for complete search history.

(56) References Cited

U.S. PATENT DOCUMENTS

| 4,884,939 A * | 12/1989 | Nielsen | E02F 3/435 356/622 |
|---|---|---|---|
| 2004/0149891 A1* | 8/2004 | Cho et al. | 250/214 R |
| 2009/0138233 A1* | 5/2009 | Kludas | G01C 15/00 702/158 |
| 2012/0281200 A1 | 11/2012 | Rindle | |

FOREIGN PATENT DOCUMENTS

CN    1782664 A    6/2006

OTHER PUBLICATIONS

Bent, Sarah, et al., "LEDS as both Optical Sources and Detectors in Bi-directional Plastic Optical Fibre Links." ISSC 2006, Dublin Institute of Technology, Jun. 28-30.
Mims III, Forrest M., "Sun photometer with light-emitting diodes as spectrally selective detectors." Applied Optics, vol. 31, No. 33, Nov. 20, 1992.

(Continued)

*Primary Examiner* — Renee Chavez
(74) *Attorney, Agent, or Firm* — Ladas & Parry LLP

(57) ABSTRACT

The invention relates to an arrangement and a method for detecting and indicating laser radiation comprising a laser device (36) producing the laser radiation, such as rotation lasers or line lasers, and an indicating device (22) with at least one laser beam detector and at least one indicating element (26, 28, 30) which indicates the detected laser radiation. In order to precisely indicate the position of the laser radiation to be detected using uncomplicated circuitry, it is proposed that the at least one laser beam detector and the at least one indicating element are the same component in form of an LED (26, 28, 30).

9 Claims, 4 Drawing Sheets

(56) References Cited

OTHER PUBLICATIONS

Dietz, Paul, et al. "Very Low-Cost Sensing and Communication Using Bidirectional LEDs." Mitsubishi Electric Research Laboratories. Jul. 2003.
Office Action with Search Report dated Apr. 1, 2016 for Chinese Application No. 201310160238.6.
espacenet English abstract of CN 1782664 A.

* cited by examiner

ARRANGEMENT AND METHOD FOR DETECTING AND INDICATING LASER RADIATION

The invention relates to an arrangement for detecting and indicating laser radiation comprising a laser device emitting the laser radiation, such as rotating lasers or line lasers, and an indicating device with at least one laser beam detector and at least one indicating element which indicates the detected laser radiation. The invention also refers to a method for the detection of laser radiation emitted from a laser device, such as rotation lasers or line lasers, and indicating the detected laser radiation.

The construction industry uses rotating point lasers for measuring a uniform level such as a horizontal or vertical plane. A laser beam is put into rotation in these so-called construction lasers to form a virtual plane in the room. The optical power of the lasers is limited in order to protect the eyes. For this reason, the laser beam can only be perceived as a line on a wall in dark rooms. Auxiliary means are therefore required to make the rotating laser beam visible in bright ambient light. These auxiliary means, which are also called optoelectronic graduated rods, indicate to the user into what direction the indicating device has to be moved in order to determine the position of the laser beam.

Traditional receivers for pulsed laser radiation are equipped with photodetectors, such as photodiodes, phototransistors or solar cells with large silicon surfaces, for example. The photodetectors are usually very expensive because of their large silicon surfaces. Photodetectors are moreover mostly infrared detectors with a maximum sensitivity in the range between 900 nm and 1000 nm, which, once their sensitivity has been reduced somewhat are also used for the detection of visible light between 400 nm and 700 nm. Using color filters in front of the photodetectors, this "bandwidth range" is mostly reduced to a small bandwidth for the radiation to be detected. Apart from the receiver, additional indications are necessary. LEDs can be used for this purpose.

A corresponding device can in principle be seen in FIG. 1. In a housing 10 photodetectors 12, 14 are arranged along a vertical straight line, by means of which incident laser radiation can be detected. One of the light emitting diodes 16, 18, 20 is switched depending on the photodetector onto which the laser radiation is applied.

An optoelectronic graduated rod for determination of the laser radiation of a rotation laser can be found in DE-C-35 12 708. The graduated rod comprises a multiplicity of optoelectronic elements running along a vertical line, with which an evaluation unit is connected with an indicating apparatus. The optoelectronic elements are photodiodes to indicate a value for height or a distance to a reference point on the indicating apparatus digitally by means of the evaluation unit. The arrangement for determining the position of a moving or pulsed light beam is based on the same principle, according to U.S. Pat. No. 3,894,230.

According to DE-A-1 915 935, the position coordinates of a laser beam relative to a specified point are determined by means of photo elements which are arranged along a straight line.

The subject of US-A-2004/01 17 995 is an apparatus for detecting the area of incidence of laser radiation, wherein receiver and indicating elements are designed as separate assemblies.

According to the prior art, the detectors and the indicating elements are arranged separately of each other so that the corresponding measuring devices are relatively bulky. The complexity in terms of circuitry is also substantial so that they are consequently susceptible to failure.

To align collectors in the direction of incident sunlight, holes are provided at a reciprocal angle in a sensor housing into which the LEDs are inserted, which are also operated as photo sensors (WO-A-2011/036247).

JP-A-06-102092 refers to an arrangement for detecting the degree of contamination of a pane which is penetrated by radiation emitted from an LED, wherein reflected radiation is detected by a photodetector, which is likewise covered by the pane.

The present invention is based on the object to further develop an arrangement and a method of the type mentioned at the outset such that the position of laser radiation to be detected can be indicated precisely, using uncomplicated circuitry. At the same time, the indicating device must have a compact design.

According to the arrangement, the object is essentially solved by the fact that the at least one laser beam detector and the at least one indicating element is the same component in form of an LED. In this context it is particularly provided that the receiving unit comprises multiple LEDs arranged along at least one straight line. In particular, it is provided that the LEDs are arranged reciprocally offset along at least two straight lines running parallel.

Due to the teaching of the invention, a compact indicating device is available to determine the position of laser radiation. A principal field of application is the construction field, in order to determine a marking or a line in a room for example, and thereafter perform work based on it.

From a procedural point of view this object is essentially solved in that the same component in form of an LED is used for detecting and indicating the laser radiation.

It is furthermore provided that a laser device is used by means of which a pulsed laser radiation is applied on the LED or which is evaluated as being pulsed from an LED, and that the LED illuminates in the time period between detected laser beam pulses.

It is particularly provided that the pulse frequency of the laser radiation for establishing the time window between the laser beam pulses is determined and that the laser radiation detected in the time window is indicated by the illumination of the LED.

According to the invention, light emitting diodes (LEDs) are used to function both as receiver as well as for producing light. Because of their high production volume and their small silicon surfaces, LEDs can be produced cost-effectively. Because of their small light-sensitive surface and their low efficiency, LEDs can only be used for direct illumination over a short distance, in principle. These disadvantages are unimportant during the detection of laser radiation, however, because this is focused to the extent necessary. In this manner, it is possible to detect laser radiation from a larger distance.

For this purpose, it is particularly provided that the laser radiation detected by the LED is converted into a voltage by means of an impedance converter for producing a signal, that the voltage is amplified and that the amplified signal is evaluated, and that the LED is then switched and emits light, when the signal has been evaluated to the extent that laser radiation to be detected has been applied on the LED.

Special filters, as they are fundamentally used with photodetectors, are then no longer necessary if the knowledge is used that the detectable wavelength of LEDs is limited to a range which is close to below the emitted wavelength. It therefore only requires that the LEDs must be tuned to the wavelength of the emitted laser radiation, without that additional filters for the suppression of interfering light influences are required, in principle.

Even though it is known to use LEDs instead for illumination also for the detection of light. This includes applications such as measuring the brightness of daylight (Klaus-Jürgen Thiesler: Elektor 2/2004, Lichtsensorik), bidirectional data transfer across short distances (Paul Dietz et al: TR2003-35 July 2003; Kyle Holland: LED doubles as emitter and detector, php, August 2001), bidirectional data transfer in glass fibers (Sarah Bent et al: LEDs as both optical Sources and Detectors in Bi-directional Plastic Optical Fibre Links, Irish Signals and Systems Conference, 2006, IET:345) or spectrally selective sunlight detectors (M. Forrest: Sun Photometer with light-emitting diodes as spectrally selective detectors, February 1992).

In contrast, laser radiation is detected and indicated according to the invention, namely with one and the same LED. In this context, it is particularly provided that several LEDs are arranged along a straight line, which preferably extends vertically, in order to determine the position of the incident laser radiation highly precisely. Since laser radiation has a large amount of beaming concentration as previously mentioned, it is therefore possible to use LEDs with low sensitivity.

If the preferred equipment of use is a rotation laser, in which the LED and/or LEDs are swept over by a rotating laser beam, then also a laser can be used which does not have a rotating laser beam but that emits one which is pulsed. The rotation of the laser beam is therefore equivalent to a pulsed laser beam.

In the "dead time," that is in the time window in which two successive light pulses are applied on the LED, the LED can then be used as transmitter. The same component is therefore used as receiver element and as indicating element at different times.

Further particulars, advantages and features of the invention can be derived not only from the Claims, the features to be derived from these, either on their own and/or in combination, but also from the following description of the preferred embodiments to be derived from the drawing, which show:

Figure 1:
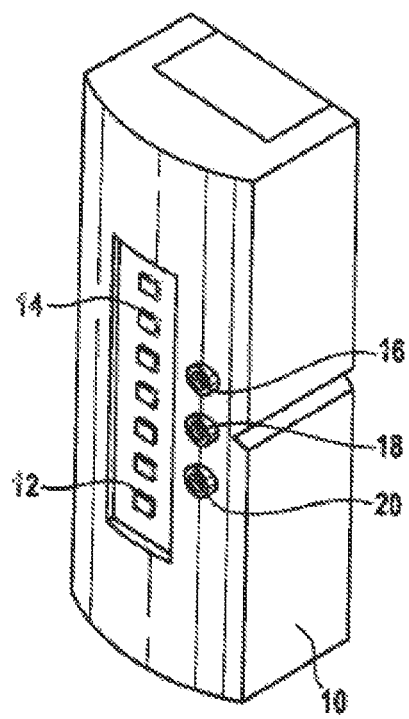
FIG. 1 is a measuring device according to the prior art.
Figure 2:
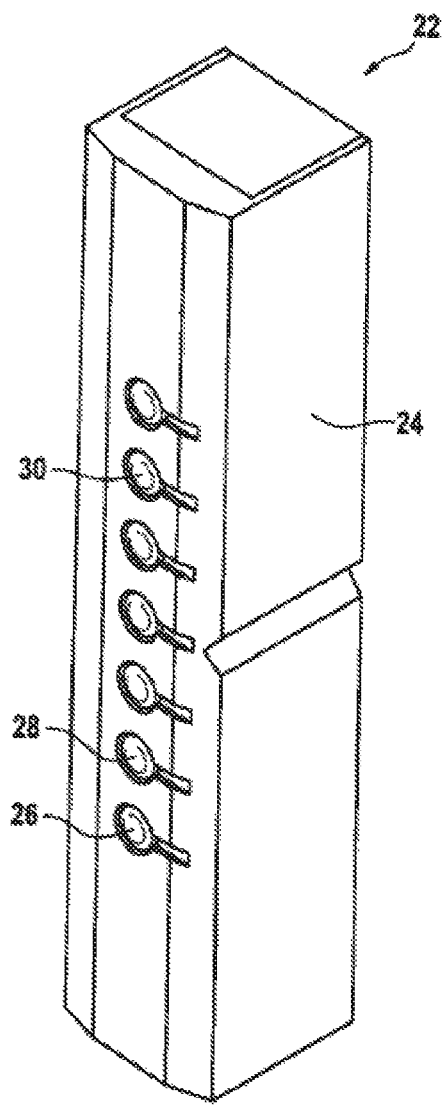
FIG. 2 is a measuring device according to the invention.

A measuring device 22 according to the invention for detecting and indicating laser radiation can be seen in FIG. 2. The measuring device 22 has a housing 24, along which several light emitting diodes 26, 28, 30 are arranged along a straight line, in particular equally spaced. In this context, the light emitting diodes 26, 28 serve both for determining incident laser radiation as well as also to indicate it. For this purpose, the characteristics of the LEDs 26, 28, 30, is utilized, in that they not only produce light but can also detect light. For this purpose, the LED operates similar to a photodiode for detecting light.

Figure 3:
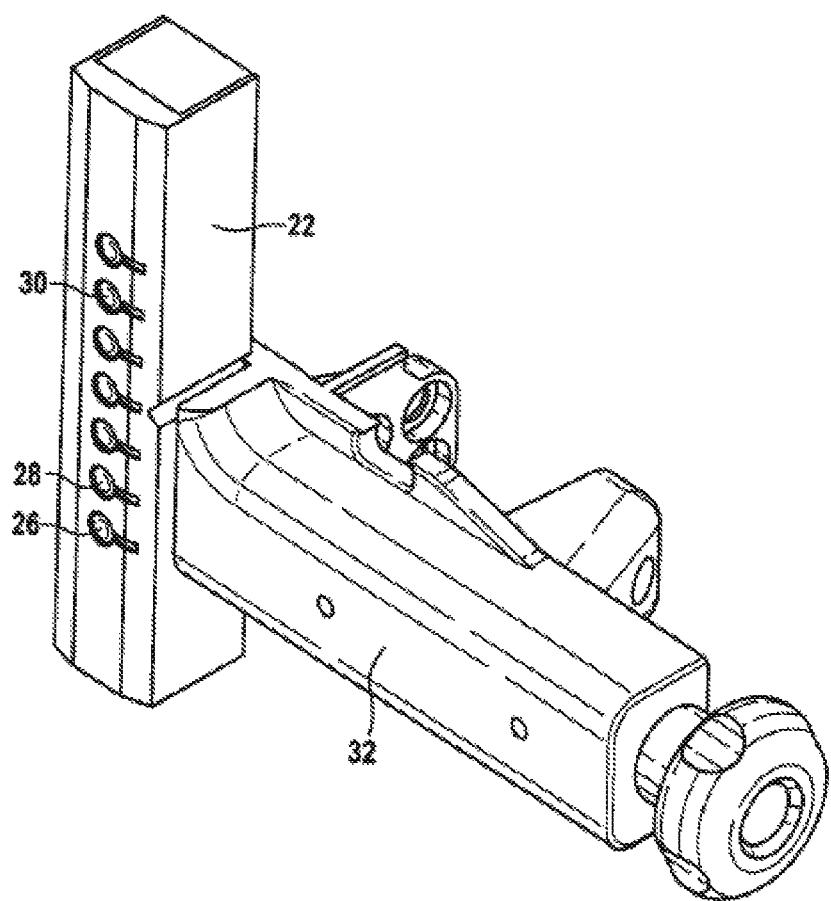
FIG. 3 is a measuring device according to FIG. 2 with a holder.
Figure 4:
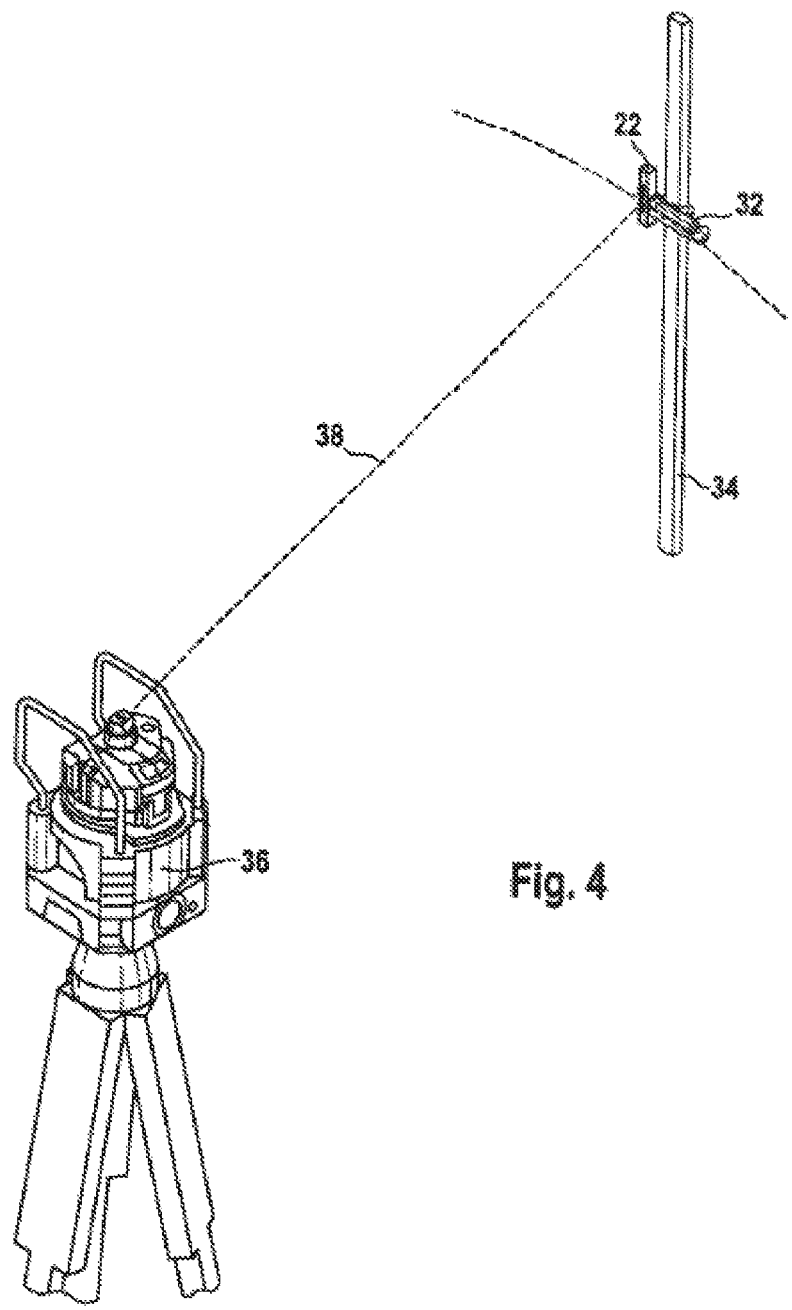
FIG. 4 is a rotation laser with an assigned measuring device.

From FIGS. 3 and 4 it can be seen that the measuring device 22 comprising the LEDs 26, 28, 30, as receiver and indicating elements can be connected by means of a holder 32 with a graduated rod 34, which should be aligned vertically. The measuring device 22 is shifted by means of the holder 32 along the graduated rod 34 for so long until the radiation 38 emitted from a laser device such as a rotation laser 36 impinges onto one of the LEDs 26, 28, 30, which then indicates the incident radiation by illumination of this LED. For this purpose it is necessary that the laser radiation 38 is either pulsed or, such as with the rotation laser 36, moves rotary and can therefore sweep over one or several LEDs 26, 28, 30 at time intervals.

Because the LEDs 26, 28, 30 have a small light-sensitive surface and a low efficiency, the light energy is converted into a voltage by means of an impedance converter. The signal is then amplified, and optionally filtered and evaluated.

During the "dead time" between two consecutive laser pulses, the LED is then switched to illumination and is therefore used as transmitter. The same component is used as receiver element and as indicating element at different times. The switching and therefore the illumination of the LED only occurs if the signal has been evaluated to the extent that laser radiation must be detected which has been applied on the LED.

According to the invention the following is provided:

detecting a pulsing and/or rotating laser beam with the help of light emitting diodes (LEDs), determining the pulse frequency and establishing and synchronizing a time window for receiving during the transmission time of the laser and indicating the signals during the "dead time," i.e. between two pulses, converting the pulsing luminous efficacy of the laser into an alternating voltage, amplification of the useful signal, optional suppression of interference signals, indication of the detected signals with the LED receiving the radiation.

According to the invention, the measuring device 22 contains several LEDs 26, 28, 30 connected as detectors for detecting a laser beam evaluated as pulsing as well as a rotating laser beam. The LEDs 26, 28, 30 function time-shifted and synchronously to the transmission signal also as an indicating element. Consequently, the level of the laser beam, i.e. its position, is visible directly on the LED which is receiving the laser light. The invention is obviously not abandoned, if separate indicating elements are addressed additionally A separate LED, such as a green LED, can be assigned to the indicating edge 25, for example, which, when red laser light is applied on it, cannot function as a receiver/transmitter itself. The green LED could be switched if one or multiple assigned receiver/transmitter LEDs are impinged. There is also the possibility to activate an LCD field, for example, by means of one or several transmitter/receiver LEDs onto which laser radiation has been applied, in order to indicate desired information.

Independently of that, initially the pulse frequency of the laser signal, that is at the rotation laser, the sweep-over times are determined and the reception time is established synchronously to the transmitter. The time without reception signal will then be used for indicating the signal plane. The signal plane is the plane in which the laser beam impinges on at least one of the three LEDs 26, 28, 30.

The received pulsating laser light signal is converted into a voltage, which eliminates interference signals from the useful signal with the help of amplification and optional filter circuits. Interference signals can be for instance sunlight, a net frequency and/or its first overtone of a rhythmically connected lamp or flashing lights of warning lights. If the LED is selected with reference to the emitting wavelength, however, which is slightly above the wavelength of the laser radiation, then a filter circuit may not be required, so that the complexity in terms of circuitry is consequently simplified.

If several measurements are performed during the time of the sweep-over, then an image of the point shape of the laser beam can be created (such as when several LEDs are exposed to the laser beam). Using this beam profile, the center can be determined and also the distance if the laser profile is known. The prerequisite is that the beam profile changes across the distance, making it possible to form an opinion regarding the distance, if the change in the beam profile is known.

There is also the possibility to arrange the transmitter/receiver LEDs in the form of a matrix in order to detect the angular position of the measuring device. The prerequisite is that the measuring device 22 has at least two rows of LEDs running along the longitudinal axis of the measuring device 22. If two LEDs are activated, for example, which are not in a common horizontal plane, but in a plane which cuts the vertical at an angle <90°, it can be recognized that the longitudinal axis of the measuring device is not aligned vertically.

The invention claimed is:

1. An arrangement for detecting and indicating laser radiation, comprising:
    a construction laser device selected from the group consisting of a rotating laser and a line laser, wherein the construction laser device generates and focuses the laser radiation; and
    a measuring device comprising a plurality of LEDs;
    wherein each one of said plurality of LEDs is synchronized, both to detect the laser radiation during a transmission time of the laser, and to indicate the detected laser radiation during a dead time between two consecutive laser pulses, such that each one of said plurality of LEDs is used as a receiver element and as an indicating element at different times.

2. The arrangement according to claim 1, wherein the plurality of LEDs are arranged in a straight line.

3. The arrangement according to claim 2, wherein the LEDs are arranged along parallel first and second straight lines.

4. The arrangement according to claim 3, wherein the LEDs in the first straight line are reciprocally offset with respect to the LEDs in the second straight line.

5. A method for detecting and indicating laser radiation emitted from a construction laser, the method comprising:
    providing a construction laser device selected from the group consisting of a rotating laser and a line laser, wherein the construction laser device generates and focuses the laser radiation;
    providing a measuring device comprising a plurality of LEDs;
    wherein each of said plurality of LEDs both detects the laser radiation and indicates the detected laser radiation in a time-shifted manner;
    generating laser radiation using the laser device;
    focusing the laser radiation; and
    synchronizing each one of said plurality of LEDs, both to detect the laser radiation during a transmission time of the laser, and to indicate the detected laser radiation during a dead time between two consecutive laser pulses, such that each one of said plurality of LEDs is used as a receiver element and as an indicating element at different times.

6. The method according to claim 5, further comprising:
    generating a pulsed laser beam from the construction laser device; and
    detecting light from the pulsed radiation using the LEDs;
    wherein the LEDs indicate the detected laser beam pulses during a time interval between the detected laser beam pulses.

7. The method according to claim 6, further comprising:
    determining a laser beam pulse frequency to establish the time interval between the laser beam pulses;
    detecting the laser radiation in the time interval; and
    indicating the laser radiation by illumination of the LED.

8. The method according to claim 6, further comprising:
    converting the laser radiation detected by the LED into a voltage;
    amplifying the voltage to produce an amplified signal;
    evaluating the amplified signal; and
    if the amplified signal is evaluated to the extent that sufficient laser radiation is applied on the LED to switch on the LED, observing light emitted by the LED.

9. An arrangement for detecting and indicating laser radiation, comprising:
    a construction laser device selected from the group consisting of a rotating laser and a line laser, wherein the construction laser device generates and focuses the laser radiation;
    a measuring device comprising a plurality of LEDs arranged in a straight line;
    wherein each one of said plurality of LEDs is synchronized, both to detect the laser radiation during a transmission time of the laser, and to indicate the detected laser radiation during a dead time between two consecutive laser pulses, such that each one of said plurality of LEDs is used as a receiver element and as an indicating element at different times;
    a holder; and
    a graduated rod connected by the holder to the construction laser device.

* * * * *